United States Patent [19]

Muenstedt et al.

[11] Patent Number: 4,607,083

[45] Date of Patent: Aug. 19, 1986

[54] LONG-TERM STABILITY OF THE ELECTRICAL CONDUCTIVITY OF PYRROL POLYMERS

[75] Inventors: Helmut Muenstedt, Wachenheim; Herbert Naarmann, Wattenheim, both of Fed. Rep. of Germany

[73] Assignee: BASF Aktiengesellschaft, Ludwigshafen, Fed. Rep. of Germany

[21] Appl. No.: 684,033

[22] Filed: Dec. 20, 1984

[30] Foreign Application Priority Data

Dec. 24, 1984 [DE] Fed. Rep. of Germany ....... 3346934

[51] Int. Cl.⁴ ........................................... C08F 283/00
[52] U.S. Cl. ................................. 525/417; 204/59 R
[58] Field of Search ................ 204/59 R, 72; 525/417

[56] References Cited

U.S. PATENT DOCUMENTS

| | | | |
|---|---|---|---|
| 3,574,072 | 4/1971 | Louvar et al. | 204/72 |
| 4,468,291 | 8/1984 | Naarmann et al. | 204/59 R |
| 4,547,270 | 10/1985 | Naarmann | 204/59 R |

OTHER PUBLICATIONS

J. C. S. Chem. Society, 1979, S 635.
J. C. S. Chem. Society, 1979 S 854.

*Primary Examiner*—R. L. Andrews
*Attorney, Agent, or Firm*—Keil & Weinkauf

[57] ABSTRACT

The long-term stability of the electrical conductivity of pyrrole polymers is improved by a process in which the polymers are treated with an aqueous alkali metal hydroxide solution. Pyrrole polymers treated in this manner are used as electrical conductor elements or resistive films.

6 Claims, No Drawings

LONG-TERM STABILITY OF THE ELECTRICAL CONDUCTIVITY OF PYRROL POLYMERS

The present invention relates to a process for improving the electrical conductivity of pyrrole polymers which contain complexing agents.

Electrically conductive pyrrole polymers have been disclosed, for example in U.S. Pat. No. 3,574,072 and in the publications by A. F. Diaz et al., J. Chem. Soc. Chem. Comm. (1979), 635 et seq., and ibid., 854 et seq. These electrically conductive pyrrole polymers are formed by anodic polymerization of pyrrole in the presence of a conductive salt. The anions of the conductive salts act as complexing agents with properties such that the system comprising the polypyrrole and the complexing agent is conductive. The use of electrically conductive pyrrole polymers in the electrical industry, for example as switches and other electrical components, has been described in a number of earlier proposals and publications.

We have found that the electrically conductive pyrrole polymers disclosed to date have a certain degree of sensitivity to the action of atmospheric oxygen, so that the conductivity is reduced on prolonged storage in the air. Furthermore, when such complexed pyrrole polymers are used as conductors in batteries, the conductivity can decrease over a relatively long period.

It is an object of the present invention to provide a process which improves the long-term stability of the electrical conductivity of pyrrole polymers.

We have found that this objective is achieved, in accordance with the invention, by a process in which the pyrrole polymers are treated with an aqueous alkali metal hydroxide solution.

Another embodiment of the invention comprises the use of the pyrrole polymers treated in this manner as conductor elements in the electrical industry or as resistive films.

The electrically conductive compounds used according to the invention, from the class consisting of the pyrrole polymers, possess a high electrical conductivity of, in general, about $10^2$ S/cm.

The pyrrole polymers are obtained by polymerization of compounds from the class consisting of the pyrroles. Compounds from this class are pyrrole itself and substituted pyrroles, such as the N-alkylpyrroles, the N-arylpyrroles which are monosubstituted or disubstituted by alkyl at the carbon atoms, and those which are monosubstituted or disubstituted by halogen at the carbon atoms. In order to prepare polymers used according to the invention, pyrrole can be employed alone or as a mixture with other compounds from the class consisting of the pyrroles. Preferably, polymers of unsubstituted pyrrole are used. If polymers of substituted pyrroles are employed, those of 3,4-dialkylpyrrole, in particular where alkyl is of 1 to 4 carbon atoms, and of 3,4-dihalopyrroles, in particular of 3,4-dichloropyrrole, are preferred.

The polymers can, if required, also contain, as copolymerized units, certain amounts of other compounds which copolymerize with pyrroles. Examples of suitable compounds of this type are cyclopentadiene-azulene and its derivatives, such as benzazulene or kajaazulene, and fulvene, indene and quadratic acid. Heterocyclic compounds, such as imidazole, thiazole, furan or thiophene, are also suitable. 2-Bromothiophene, 2,6-dimethylpyridine, pyrazine and aminoaromatics, such as aniline, phenazetine, aminopyrroline or 2-aminoanthracene, can also be used. The polymers can contain, as copolymerized units, from 1 to 10 parts, based on 10 parts of pyrrole, of the compounds which copolymerize with pyrrole.

The polymers are preferably obtained by electrochemical polymerization of the pyrroles, the polymerization of the monomers being carried out by anodic oxidation using, for example, a current density of from 2 to 20 mA/cm$^2$. The voltages applied are generally from 10 to 50 volt. The polymerization is advantageously carried out in the presence of auxiliary liquids in which the pyrroles are soluble, and polar organic solvents can be used for this purpose. If a water-miscible solvent is used, small amounts of water may also be added. Preferred solvents are alcohols, ethers, such as dioxane or tetrahydrofuran, acetone, acetonitrile, dimethylformamide and N-methylpyrrolidone.

The polymerization is carried out in the presence of complexing agents. These are salts which contain as anions, for example, those from the group consisting of $BF_4^-$, $AsF_4^-$, $AsF_6^-$, $SbF_6^-$, $SbCl^-$, $PF_6^-$, $ClO_4^-$, $HSO_4$ and $SO_4^{2-}$, or preferably those of aromatic sulfonic acids, such as benzenesulfonic acid or toluenesulfonic acid, or of other organic acids, such as benzoic acid.

The salts contain, for example, lithium, sodium or potassium as cations. Other very advantageous cations are the $NO^+$, and $NO_2^+$ cations and in particular the onium cations, especially those of nitrogen and of phosphorus, for example of the $R_4N^+$ and $R_4P^+$ type, where the radicals R are hydrogen and/or lower alkyl, preferably of 1 to 6 carbon atoms, cycloaliphatic radicals, preferably of 6 to 14 carbon atoms, or aromatic radicals, preferably of 6 to 14 carbon atoms. Particularly preferred ammonium and phosphonium cations are those in which the radicals R are hydrogen and/or alkyl of 1 to 4 carbon atoms, examples of preferred onium cations being the $NH_4^+$ ion and, in particular, the tetramethylammonium, the tetraethylammonium, the tetra-n-butylammonium, the triphenylphosphonium and the tri-n-butylphosphonium cation. The use of compounds from this class has been disclosed and does not form a subject of the invention. In general, the compounds are used in an amount such that the pyrrole polymers contain from 10 to 40 mol %, based on 1 mole of pyrrole, of complexing agent.

However, the pyrrole polymers can also be prepared using another conventional method. For example, pyrrole can be polymerized in aqueous solution with the aid of a strong acid or with an inorganic peroxy compound, such as potassium persulfate. In the last mentioned process, pyrrole polymers are obtained in the form of a fine powder. In this process, too, salts of the type described above are present, so that the pyrrole polymers are complexed with the corresponding anions.

The complexed pyrrole polymers which are suitable for the process can be present in various forms. For example, anodic oxidation of the pyrroles gives a polymer which is complexed with anions and has the shape of the anode used. If the anode is sheet-like, a sheet-like layer of the polymer is formed. If the method used gives a pyrrole polymer in the form of a fine powder, this can be pressed by a conventional method, under superatmospheric pressure and while heating, to give moldings. Temperatures of from 150° to 300° C. and pressures of from 50 to 150 bar are generally used. In this conventional process for the preparation of the anionically complexed pyrrole polymers, it is therefore possible to obtain moldings of any shape. For example, films, sheets or three-dimensional structures can be used.

According to the invention, the pyrrole polymers which contain a complexing agent are treated with an aqueous alkali metal hydroxide solution, for example an aqueous solution of sodium hydroxide, potassium hydroxide or lithium hydroxide being suitable. Advantageously, the aqueous alkali metal hydroxide solution has a pH greater than 10, in particular greater than 12. With regard to handling, it has proven advantageous to use from 0.1 to 50, preferably from 0.2 to 25, % strength alkali metal hydroxide solution.

The treatment time varies, depending on the concentration of the alkali metal hydroxide solution. For example, it is sufficient if films of the complexed pyrrole polymers which are from 10 to 100 μm thick are treated with the aqueous alkali metal hydroxide solution for up to 4 hours when the solution is 0.2% strength. When treatment with alkali metal hydroxide solutions is carried out, it is found initially that the conductivity of the sample decreases in the course of a short time. Thus, it may be found that, for example, a sample of polypyrrole which contains benzenesulfonic acid as the complexing agent experiences a change in conductivity from $10^2$ S/cm to $10^{-1}$ S/cm after treatment with 10% strength sodium hydroxide solution for 10 minutes. Hence, the conductivity is always found to decrease initially; when treatment is carried out for a longer time, the conductivity remains at the level reached, which is generally from $10^{-4}$ to 1 S/cm. This effect, too, is dependent on the concentration of the alkali metal hydroxide solution used. If, for example, polypyrrole which contains benzenesulfonic acid as the complexing agent and has a conductivity of 140 S/cm is treated with sodium hydroxide solutions of various concentrations, it is found that the conductivity falls to a particular level.

This makes it possible to adjust the conductivities of films of pyrrole polymers to particular resistivities. Such a process can give resistive films which have a defined electrical resistance.

If the conductivity of polypyrrole is monitored over a prolonged period, it is found that, when the samples are stored in air at, for example, 140° C., their conductivity decreases to half the initial value in the course of 40 hours. In the case of samples treated with sodium hydroxide solutions of various concentrations from, for example, 0.2 to 50%, the change in conductivity over the same period is scarcely measurable. Hence, it was surprising that, after the treatment according to the invention, the long-term stability of the electrical conductivity is significantly increased. The fact that the treatment can be used to reduce conductivities selectively to a certain value desired for the particular field of use has also proven advantageous.

Occasionally, it has proven advantageous if, after being treated with the alkali metal hydroxide solutions, the complexed pyrrole polymer samples are treated with strong acids, e.g. sulfuric acid or hydrochloric acid, whose concentration is from 0.1 to 25%. This acid treatment results in an increase in the conductivity compared with that achieved after the alkali treatment. The acid-treated samples likewise have long-term stability similar to that of samples treated with alkali metals, the only difference being that the conductivity in this case is higher than that of samples treated with alkali metal hydroxide solutions.

EXAMPLE 1

An 80 μm thick polypyrrole film which contained 30 mol %, based on 1 mole of pyrrole, of benzenesulfonic acid as the conductive salt was treated with sodium hydroxide solution of various concentrations for 240 minutes.

The samples treated with sodium hydroxide solution and the untreated sample were stored in air for 50 days at 140° C. The conductivities of the samples at the beginning of the storage period were determined, and expressed as a ratio of the conductivities after storage for 50 days. $\sigma_o$ is the conductivity at the beginning of storage, and $\sigma$ is the conductivity when the experiments are complete. The following results were obtained:

$\sigma/\sigma_o=0.09$ for standard polypyrrole $\sigma/\sigma_o=0.35$ for polypyrrole treated with 0.2% strength NaOH $\sigma/\sigma_o=0.80$ for polypyrrole treated with 1% strength NaOH $\sigma/\sigma_o=0.86$ for polypyrrole treated with 2% strength NaOH $\sigma/\sigma_o=0.70$ for polypyrrole treated with 5% strength NaOH $\sigma/\sigma_o=0.90$ for polypyrrole treated with 20% strength NaOH As can be seen from the above results, the conductivity of the samples which are treated with sodium hydroxide solution decreases to a substantially smaller extent than that of the untreated sample.

EXAMPLE 2

A sample of polypyrrole having the same characteristics as that in Example 1 was treated with sodium hydroxide solution of various concentrations for 120 minutes and then washed and dried. The conductivity was measured, and the following result was obtained:

| Treatment | [S/cm] |
| --- | --- |
| none | 140 |
| 0.2% strength NaOH | 113 |
| 1% strength NaOH | 68 |
| 2% strength NaOH | 22 |
| 5% strength NaOH | 2.1 |
| 20% strength NaOH | 1.6 |

The above results show that, for a constant treatment time, the decrease in the conductivity is the greater the higher the concentration of the alkali.

We claim:

1. A process for improving long-term stability of the electrical conductivity of a pyrrole polymer containing a complexing agent which comprises: contacting said pyrrole polymer containing a complexing agent with an aqueous alkali metal hydroxide solution.

2. The process of claim 1, wherein the aqueous alkali metal hydroxide solution has a pH greater than 12.

3. The process of claim 1, wherein a 0.2 to 25% strength alkali metal hydroxide solution is used in the process.

4. The process of claim 1, wherein the aqueous alkali metal hydroxide solution has a pH greater than 10.

5. The process of claim 1, wherein a 0.1–50% strength alkali metal hydroxide solution is used.

6. The process of claim 1, wherein the polymer is subsequently treated with a strong acid.

* * * * *